United States Patent
Nolta et al.

(10) Patent No.: US 10,556,486 B2
(45) Date of Patent: Feb. 11, 2020

(54) AXIAL RETENTION MEANS

(71) Applicant: Hanon Systems, Daejeon (KR)

(72) Inventors: James Nolta, Canton, MI (US); Yafei Zhou, Canton, MI (US)

(73) Assignee: HANON SYSTEMS, Daejeon (KR)

( * ) Notice: Subject to any disclaimer, the term of this patent is extended or adjusted under 35 U.S.C. 154(b) by 248 days.

(21) Appl. No.: 15/608,197

(22) Filed: May 30, 2017

(65) Prior Publication Data

US 2018/0345752 A1 Dec. 6, 2018

(51) Int. Cl.
*B60H 1/00* (2006.01)

(52) U.S. Cl.
CPC ..... *B60H 1/00857* (2013.01); *B60H 1/00678* (2013.01); *B60H 2001/00707* (2013.01)

(58) Field of Classification Search
CPC ............ B60H 1/00678; B60H 1/00857; B60H 2001/00707; F16B 21/076; F16B 21/02; F16J 1/18
See application file for complete search history.

(56) References Cited

U.S. PATENT DOCUMENTS 3,001,285 A * 9/1961 Cairelli .................. B64D 17/58
30/127
3,288,093 A * 11/1966 Warga .................... A41H 43/00
112/104
2011/0048198 A1* 3/2011 Watanabe .............. B26D 1/385
83/72
2011/0187129 A1* 8/2011 Graute .................... E05B 81/20
292/2

FOREIGN PATENT DOCUMENTS

DE      102015108316 A1 * 12/2016    ......... B60H 1/00678
FR           2896284 A1 *  7/2007    ......... B60H 1/00521
KR      1020120020580 A    3/2012

* cited by examiner

*Primary Examiner* — Steven S Anderson, II
(74) *Attorney, Agent, or Firm* — Shumaker, Loop & Kendrick, LLP; James D. Miller

(57) ABSTRACT

An air-handling system includes a housing having a passageway formed therethrough. A diverter is rotatably coupled to the housing, and includes a door disposed in the passageway for selectively opening and closing the passageway. A shaft of the door extends through a first opening of the housing, and extends outwardly therefrom, defining a first axis. A lever is coupled to the shaft of the diverter. A flexible tab is disposed axially outwardly of the lever and is positionable in a first position and a second position. In the first position, a distal end of the tab is positioned radially inwardly of an outer circumferential surface of the lever, and in the second position the distal end of the tab is positioned radially outwardly of the outer circumferential surface of the lever. The distal end is moveable about a second axis, parallel to the first axis.

20 Claims, 7 Drawing Sheets

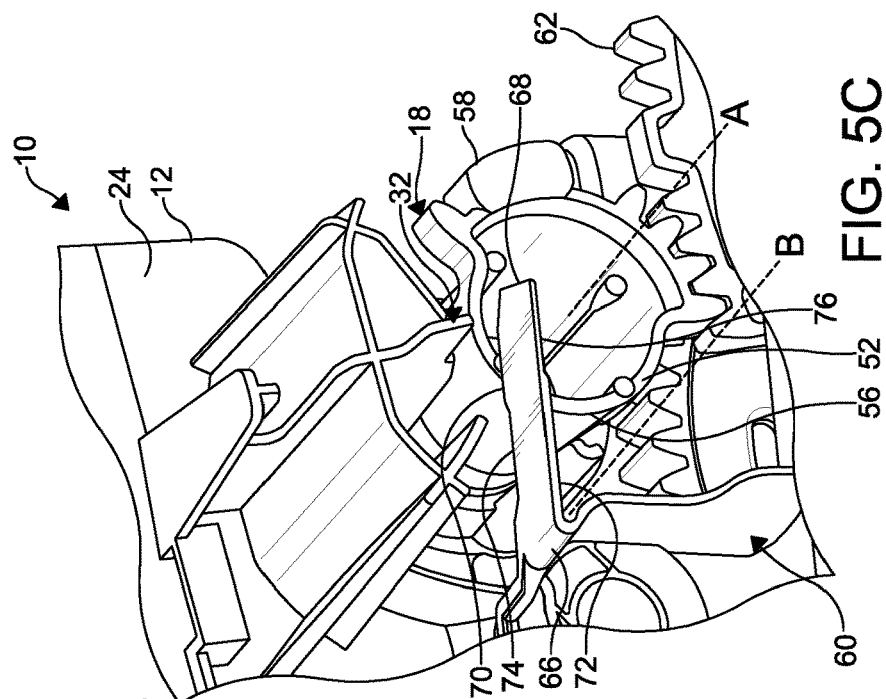
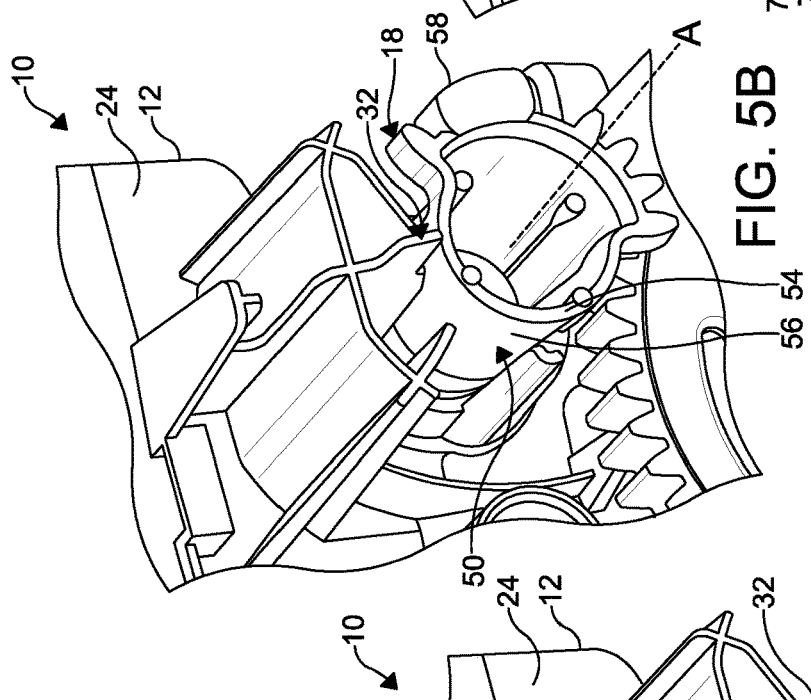
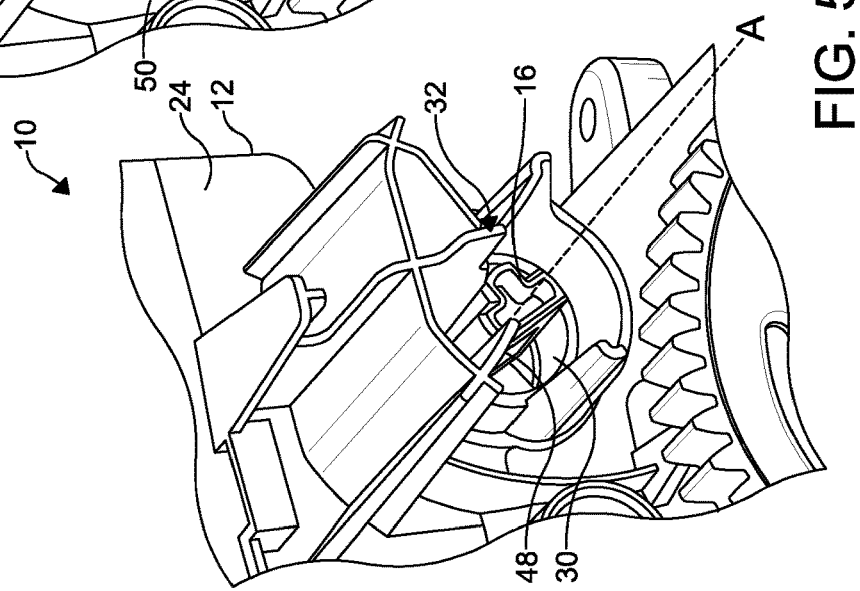

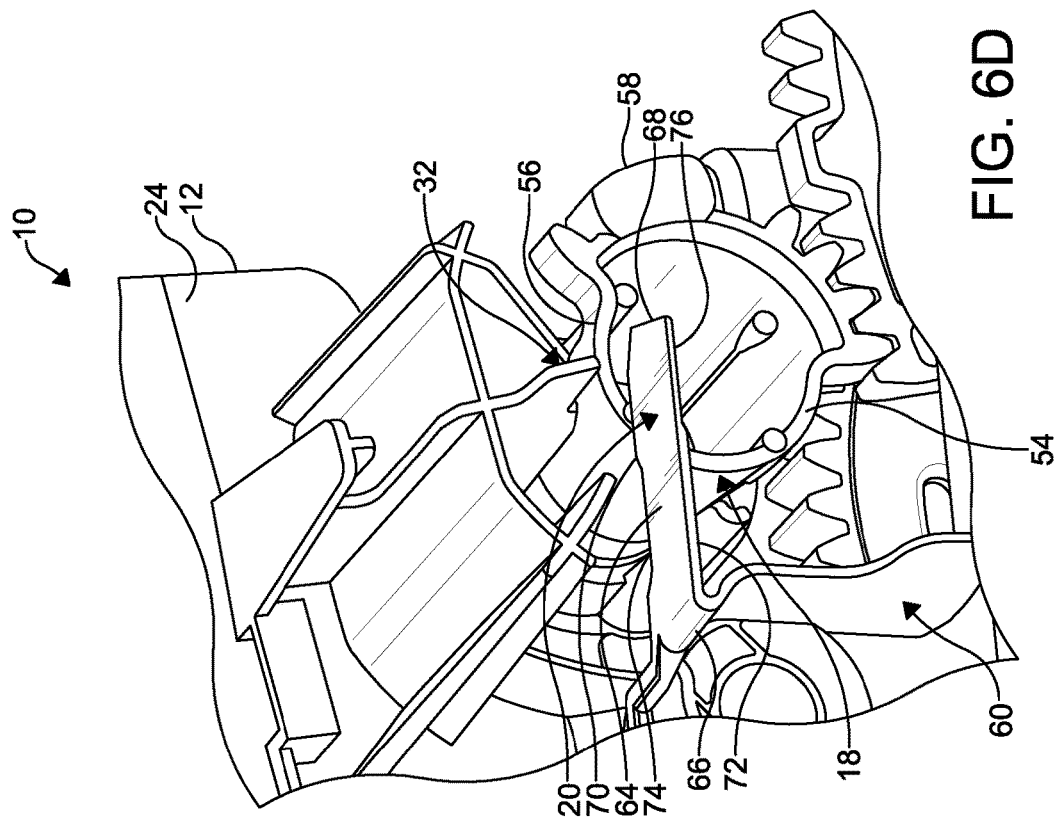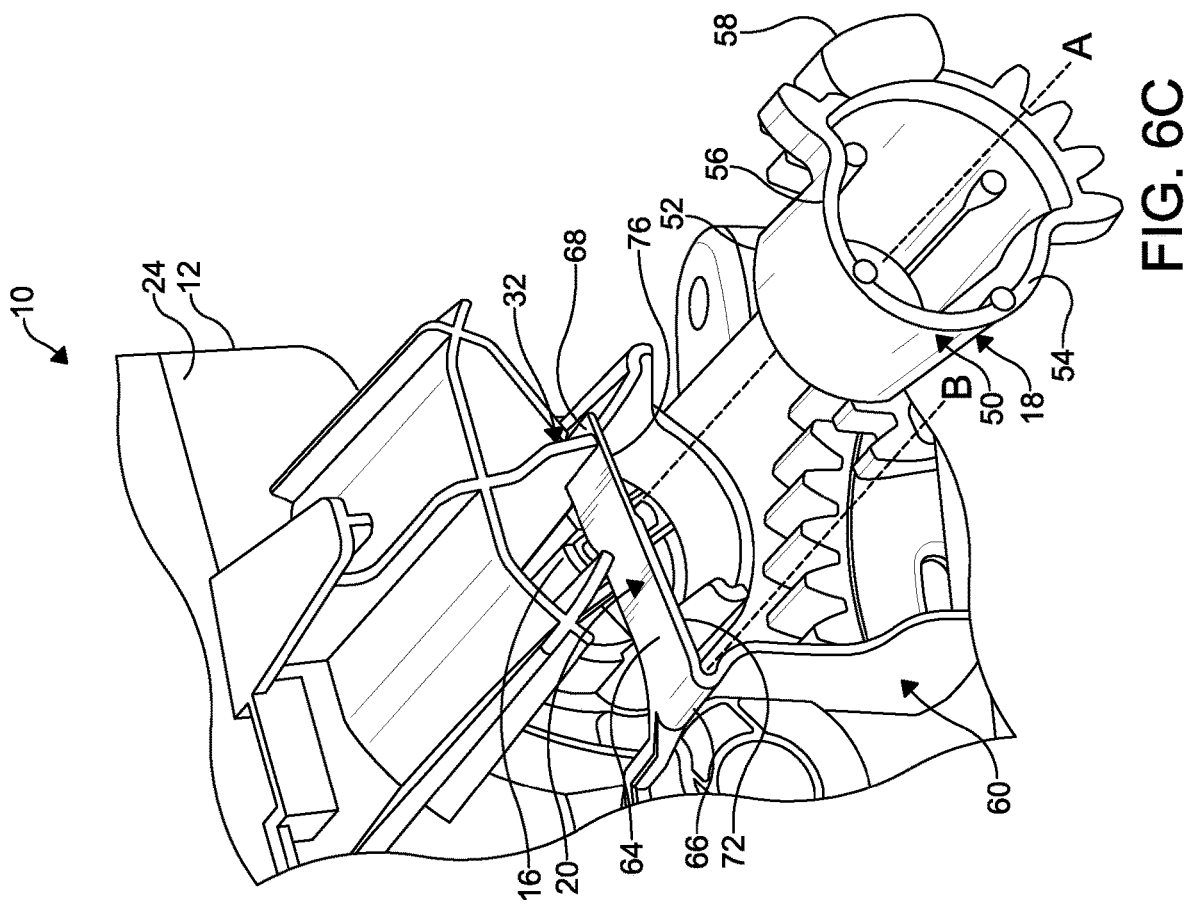

AXIAL RETENTION MEANS

FIELD OF THE INVENTION

The invention relates to an apparatus and method for retaining an axial position of a lever in an assembly, and more particularly to an apparatus and method for retaining an axial position of a lever in an air-handling system.

BACKGROUND

A vehicle typically includes a climate control system which maintains a temperature within a passenger compartment of the vehicle at a comfortable level by providing heating, cooling, and ventilation. Comfort is maintained in the passenger compartment by an integrated mechanism referred to in the art as a heating, ventilation and air conditioning (HVAC) air-handling system. The air-handling system conditions air flowing therethrough and distributes the conditioned air throughout the passenger compartment.

The air-handling system commonly employs a housing having a network of conduits formed therein. The housing further includes a plurality of diverters associated with the network of conduits for selectively controlling the flow of the air to various vents within the passenger compartment of the vehicle, depending on an operating mode selected by a vehicle occupant. For example, the flow of air may be selectively provided to a first vent of the passenger compartment by rotatably opening and closing a first one of the diverters.

Although the diverters are disposed within the housing, a means for controlling the position of each of the diverters is disposed external to the housing. For example, a shaft of the diverter may extend through an opening formed in a wall of the housing to engage a drive assembly, wherein the drive assembly engages the shaft to control a rotational position of the diverter.

To ensure proper kinematics, gears of various sizes couple the shaft of the diverter to the drive assembly. Particularly, a lever must be fitted to the shaft of the diverter. Because the diverter is substantially disposed within the housing, while the shaft of the diverter extends through the opening in the wall of the housing, the lever of the shaft must be assembled to the shaft of the diverter after the shaft is inserted through the opening. Although functional, traditional means of assembling the lever to the shaft of the diverter are not without drawbacks. For example, an axial position of the lever with respect to the shaft and the drive must be secured to ensure proper operation of the air-handling system.

In one embodiment of the prior art, a means of securing the axial position of the lever includes a resilient snap barb formed on an inner portion of the lever. As the shaft of the diverter is received axially through the lever, the snap barb aligns with a detent of the shaft, and springs inward to engage the detent, thereby securing the axial position of the lever with respect to the shaft. However, because the snap barb is disposed within the lever, a position of the snap barb within the detent is difficult for traditional sensors to measure and requires human verification, thereby increasing labor costs and likelihood for human error.

In another common configuration, the axial alignment of the lever is secured by a mounting bracket of the drive, wherein a hub of the lever is secured within an opening formed in the mounting bracket by a pair of radially outwardly extending barbs. The barbs are formed on the hub of the lever, and spring radially outwardly once passed through the opening, thereby engaging the mounting bracket to secure an axial position of the lever with respect to the mounting bracket. However, this configuration is functionally deficient, as rotational friction between the barbs and the mounting bracket increases a torque required to rotate the diverter. In addition to functional deficiencies, this configuration also requires that the lever be assembled to the mounting bracket prior to installing the mounting bracket to the housing. This not only dictates an order of assembly order for the air-handling system, but increases supply chain costs, as the package density of the mounting bracket assembly is decreased by the preassembled lever.

Alternatively, the means of securing axial position may include independent fasteners, such as snap rings or threaded fasteners. However, although assembly and verification of these independent fasteners can be automated, they undesirably increase manufacturing costs by requiring additional assembly steps and increasing supply chain complexity.

Accordingly, there exists a need in the art for an improved means of assembling rotating components in an air-handling system, which allows automated assembly verification, does not increase operating torque, and does not dictate an order of assembly or the air-handling system.

SUMMARY OF THE INVENTION

In concordance with the instant disclosure, an improved means of assembling rotating components in an air-handling system, which allows automated assembly verification, does not increase operating torque, and does not dictate an order of assembly or the air-handling system.

In a first embodiment of the disclosure, an air-handling system includes a housing having a first opening formed therein. The first opening defines a first axis of the air-handling system. A shaft is rotatably coupled to the first opening of the housing, and extends outwardly from the housing. A lever is coupled to the shaft, wherein an end of the lever extends axially outwardly from the housing. The lever is rotatably fixed with respect to the shaft. The air-handling system further includes a tab disposed axially outwardly from the first end of the lever along the first axis with respect to the housing, wherein the lever is disposed intermediate an inner edge of the tab and an outer sidewall of the housing.

In another embodiment of an air-handling system of the instant disclosure, a housing includes a shaft extending therefrom. The shaft defines a first axis of the air-handling system. A tab depends from the housing and is disposed axially outwardly of the housing along the first axis. A distal end of the tab is moveable in an arcuate motion about a second axis, which is parallel to the first axis. The distal end is positionable in a first position and in a second position, wherein the second position is radially outwardly from the first position with respect to the first axis of the shaft.

In yet another embodiment, an air-handling system includes a housing having a first opening formed therein. The first opening defines a first axis of the housing. The housing further includes a protrusion extending outwardly therefrom along a direction of the first axis, and disposed radially outwardly of the first opening with respect to the first axis. A tab is flexibly coupled to the housing, wherein a distal end of the tab is moveable in an arcuate motion about a second axis of the air-handling system, the second axis parallel to the first axis. A lever is coupled to the shaft, and a portion of the lever is disposed intermediate the housing and an inner edge of the tab.

BRIEF DESCRIPTION OF THE DRAWINGS

FIGS. 5A-C are enlarged, fragmentary, top-front perspective views of the air-handling system of FIG. 1, taken at area 2 of FIG. 1, and showing a first method of assembly of the air-handling system according to the instant disclosure.

FIGS. 6A-D are enlarged, fragmentary, top-front perspective views of the air-handling system of FIG. 1, taken at area 2 of FIG. 1, and showing a second method of assembly of the air-handling system according to the instant disclosure.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
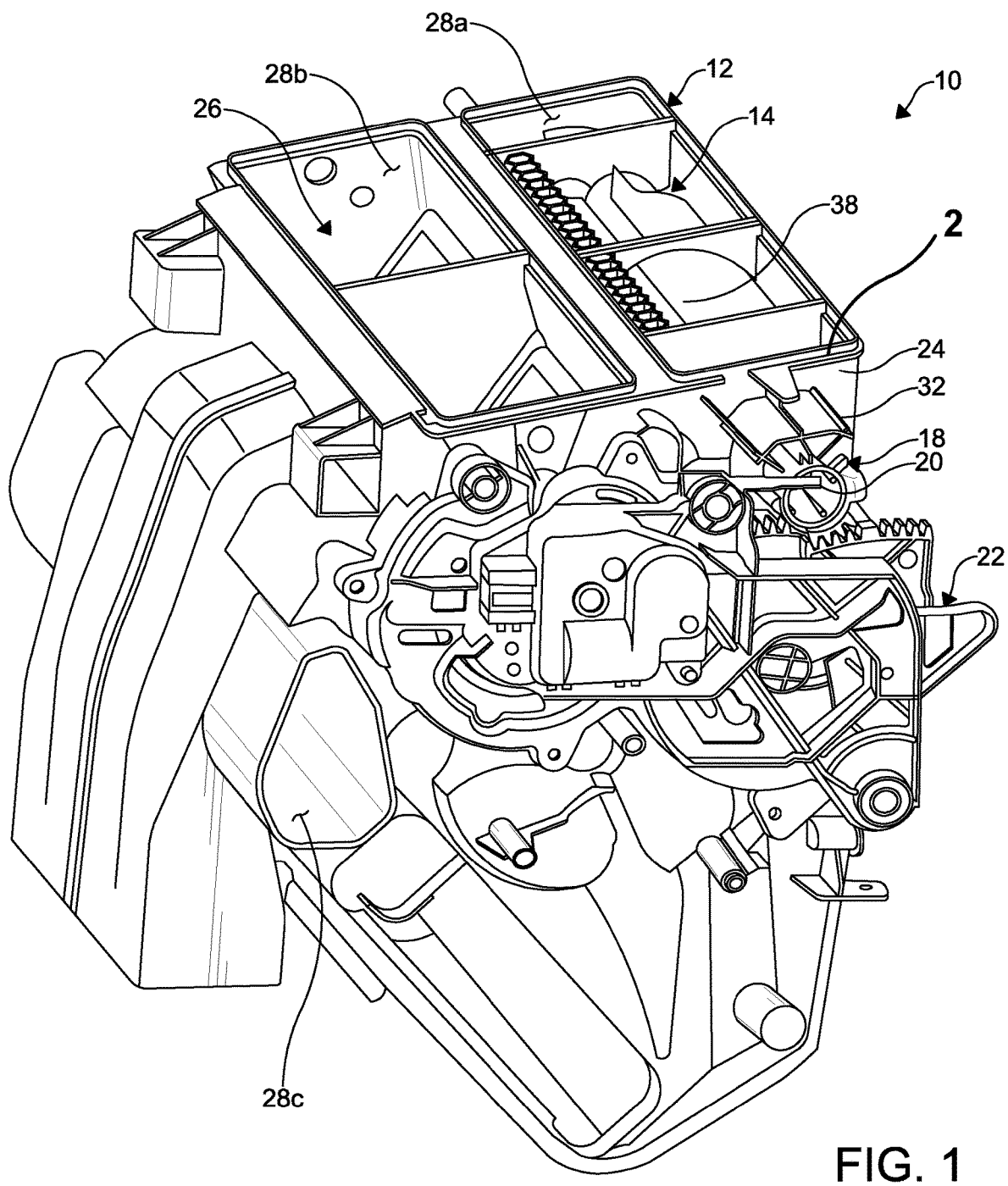
FIG. 1 is a top-front perspective view of an air-handling system according to the instant disclosure.

FIG. 1 shows an air-handling system 10 of a heating, ventilating, and air conditioning (HVAC) system for a vehicle (not shown) according to an embodiment of the disclosure. As used herein, the term "air" can refer to fluid in a gaseous state, fluid in a liquid state, or any combination thereof. The air-handling system 10 typically provides heating, ventilation, and air conditioning for a passenger compartment (not shown) of the vehicle.

The air-handling system 10 includes a hollow main housing 12, a diverter 14 rotatably coupled to the housing 12 and having a drive shaft 16 extending therefrom, a lever 18 coupled to the drive shaft 16, and a tab 20 configured to indicate and secure an axial position of the lever 18 on the drive shaft 16. The air-handling system 10 may further include a drive assembly 22 configured to control a rotational position of the diverter 14.

The housing 12 is defined by an outer sidewall 24 and includes a passageway 26 formed therethrough. The passageway 26 may have one or more heat exchangers (not shown) disposed therein, wherein a flow of air received through an inlet (not shown) of the passageway 26 is directed through the one or more heat exchangers to facilitate an exchange of thermal energy. For example, the one or more heat exchangers may include a condenser configured to remove thermal energy from the flow of the air, and/or an evaporator configured to add thermal energy to the flow of the air. The passageway 26 may further include a plurality of conduits 28a, 28b, 28c configured to distribute the flow of the air to the passenger compartment of the vehicle, as desired. For example, the passageway 26 may include a windshield conduit 28a, a floor conduit 28c, and a panel conduit 28b. Those of ordinary skill in the art will appreciate that the arrangement of the conduits 28a, 28b, 28c within the housing 12 can be determined based on desired characteristics of the vehicle.

The outer sidewall 24 of the housing 12 includes a plurality of openings 30 formed therein. The openings 30 are configured to rotatably receive a portion of the diverter 14 therethrough. As shown in FIGS. 5A and 6A, a first opening 30 is formed in the outer sidewall 24 adjacent the windshield conduit 28a, wherein the drive shaft 16 of the diverter 14 is received through the first opening 30 and extends outwardly therefrom. The first opening 30 is cylindrical in shape, and defines a first axis A of the air-handling system.

The outer sidewall 24 of the housing 12 further includes a hard stop 32 formed adjacent to the first opening 30. As shown best in FIGS. 2 and 3, the hard stop 32 is a protrusion extending outwardly from the outer sidewall 24 along a direction of the first axis A, and includes a notch 34 configured to receive a portion the tab 20 therein. The notch 34 includes a planar contact surface 36 facing radially inwardly with respect to the first axis A of the housing 12.

The diverter 14 of the air-handling system 10 is rotatably coupled to the housing 12, and is configured to control and distribute the flow of the air within the passageway 26. In the illustrated embodiment, the air-handling system 10 includes a plurality of diverters 14, wherein each of the plurality of the diverters 14 is configured to selectively open and close a portion of the passageway 26.

Although configuration of the instant disclosure is discussed with respect to a single diverter 14 disposed within the windshield conduit 28a, it will be appreciated by those of ordinary skill in the art that the housing 12 may include any number of diverters 14 configured to selectively open and close any number of conduits formed therein, and that the principal of this disclosure could be applied to any one or more of the diverters 14.

Figure 4:
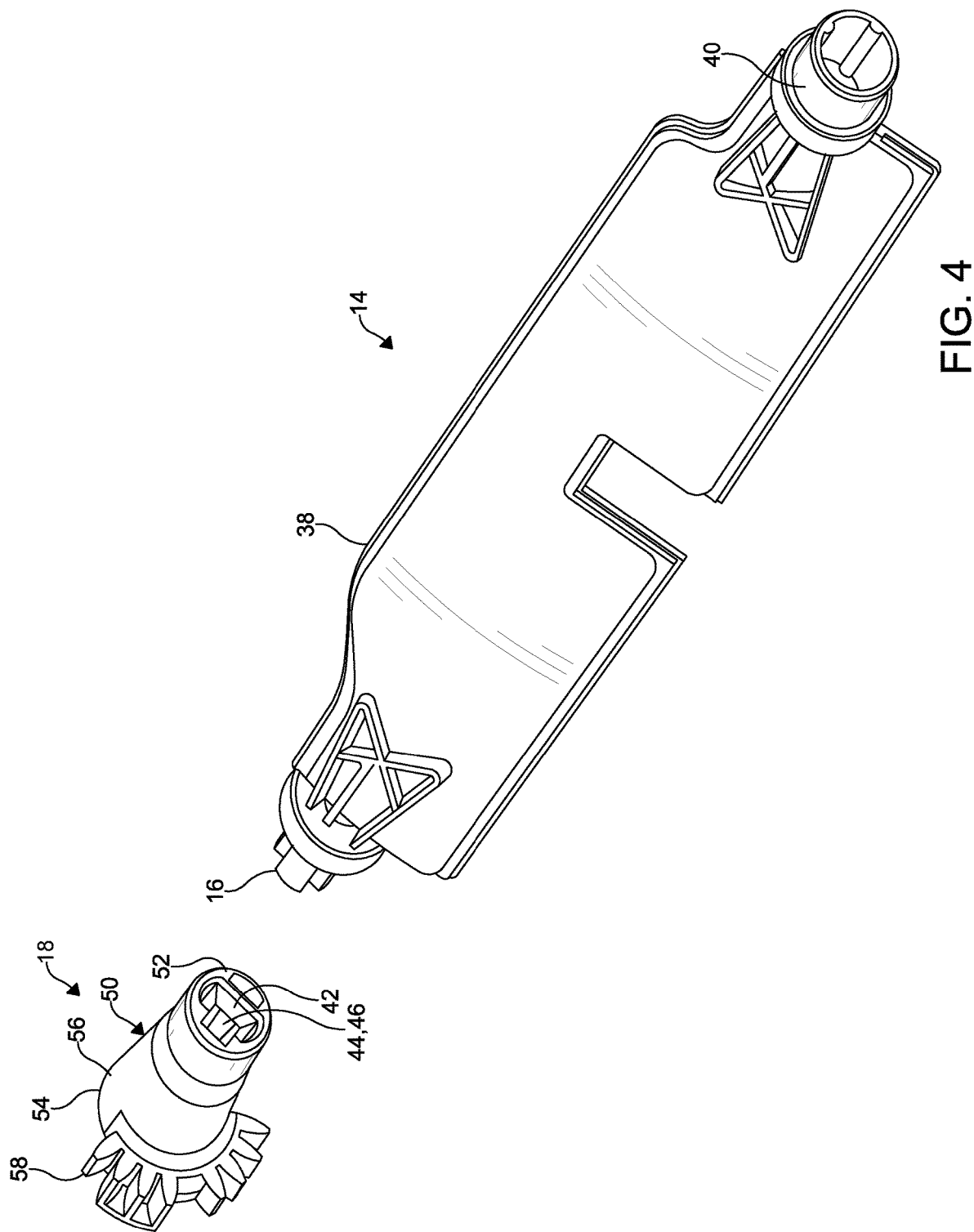
FIG. 4 is an exploded, top-rear perspective view of a diverter according to the instant disclosure.

As shown in FIGS. 1 and 4, the diverter 14 includes a substantially planar door 38 configured to be disposed within the windshield conduit 28a, wherein a rotational position of the door 38 is selectively controlled to open and close the windshield conduit 28a. Those of ordinary skill in the art will appreciate that the door 38 may be multi-planar, arcuate, or any design configured to selectively open and close a portion of the passageway 26.

The drive shaft 16 and a bearing shaft 40 extend from opposing ends of the door 38 of the diverter 14, and are rotatably received through opposing ones of the openings 30 of the outer sidewall 24. The drive shaft 16 and the bearing shaft 40 are axially aligned, and rotate about the first axis A when the diverter 14 is assembled to the housing 12. Accordingly, when the air-handling system 10 is assembled, the drive shaft 16 of the diverter 14 may further define the first axis A of the air-handling system 10.

As discussed above, the drive shaft 16 is received through the first opening 30 and extends outwardly from the outer sidewall 24 of the housing 12, as shown in FIGS. 5A and 6A. The drive shaft 16 is coupled to the drive assembly 22, wherein a rotational position of the door 38 is controlled by the drive assembly 22. In the illustrated embodiment, the drive shaft 16 has a T-shaped cross section. The bearing shaft 40 is a cylindrical shaft, and interfaces with the outer sidewall 24 of the housing 12 to provide a first rotational bearing for the diverter 14.

The lever 18 is coupled to the drive shaft 16 of the diverter 14. In the illustrated embodiment, an aperture 42 of the lever 18 slidingly receives the drive shaft 16 therethrough to couple the lever 18 to the drive shaft 16. As shown in FIG. 4, the aperture 42 of the shaft has a T-shaped cross section corresponding to the T-shaped cross section of the drive shaft 16, wherein when the drive shaft 16 is received in the aperture 42, the rotational position of the lever 18 is fixed with respect to the drive shaft 16. It will be appreciated that each of the drive shaft 16 and the aperture 42 of the lever 18 may have any shape configured to militate against respective rotational motion, such as a polygonal shape or an irregular shape.

As shown in FIGS. 3, 4, 5A, and 6A, the drive shaft 16 and the lever 18 may further include a securing means 44 configured to militate against relative axial movement of the lever 18 with respect to the drive shaft 16 when the lever 18 is assembled to the drive shaft 16. For example, one of the lever 18 and the drive shaft 16 may include a flexible finger 46 extending outwardly therefrom, and the other of the lever 18 and the drive shaft 16 may include a detent 48 formed therein, wherein the finger 46 engages the detent 48 when the finger 46 is axially aligned with the detent 48.

The lever 18 includes a cylindrical hub 50 having a first end 52 and an opposing second end 54. The first end 52 of the hub 50 is received in the first opening 30 of the outer sidewall 24 of the housing 12, and is configured to interface with the first opening 30 to provide a second rotational bearing between the diverter 14 and the housing 12. In the illustrated embodiment, an outer circumferential surface of the hub 50 cooperates with the inner circumferential surface of the first opening 30 to provide the second rotational bearing between the drive shaft 16 and the housing 12.

When the lever 18 is assembled to the drive shaft 16, the second end 54 of the hub 50 extends axially away from the housing 12 along the first axis A. The second end 54 of the hub 50 includes a sector gear formed thereon. Accordingly, the second end 54 of the hub 50 includes a cylindrical portion 56 defined by the hub 50, and a geared portion 58 having a plurality of teeth projecting radially therefrom.

The drive assembly 22 is coupled to an external surface of the outer sidewall 24, and includes a mounting bracket 60 and a plurality of the gears configured to control rotational positions of the one or more diverters 14. The drive assembly 22 further includes a motor fixed to the mounting bracket 60, and configured to control rotational positions of the plurality of the gears 62. The geared portion 58 of the second end 54 of the lever is configured to engage a corresponding gear 62 of the drive assembly 22, wherein a rotational output of the drive assembly 22 is translated to the drive shaft 16 of the diverter 14 through the lever 18.

Figure 2:
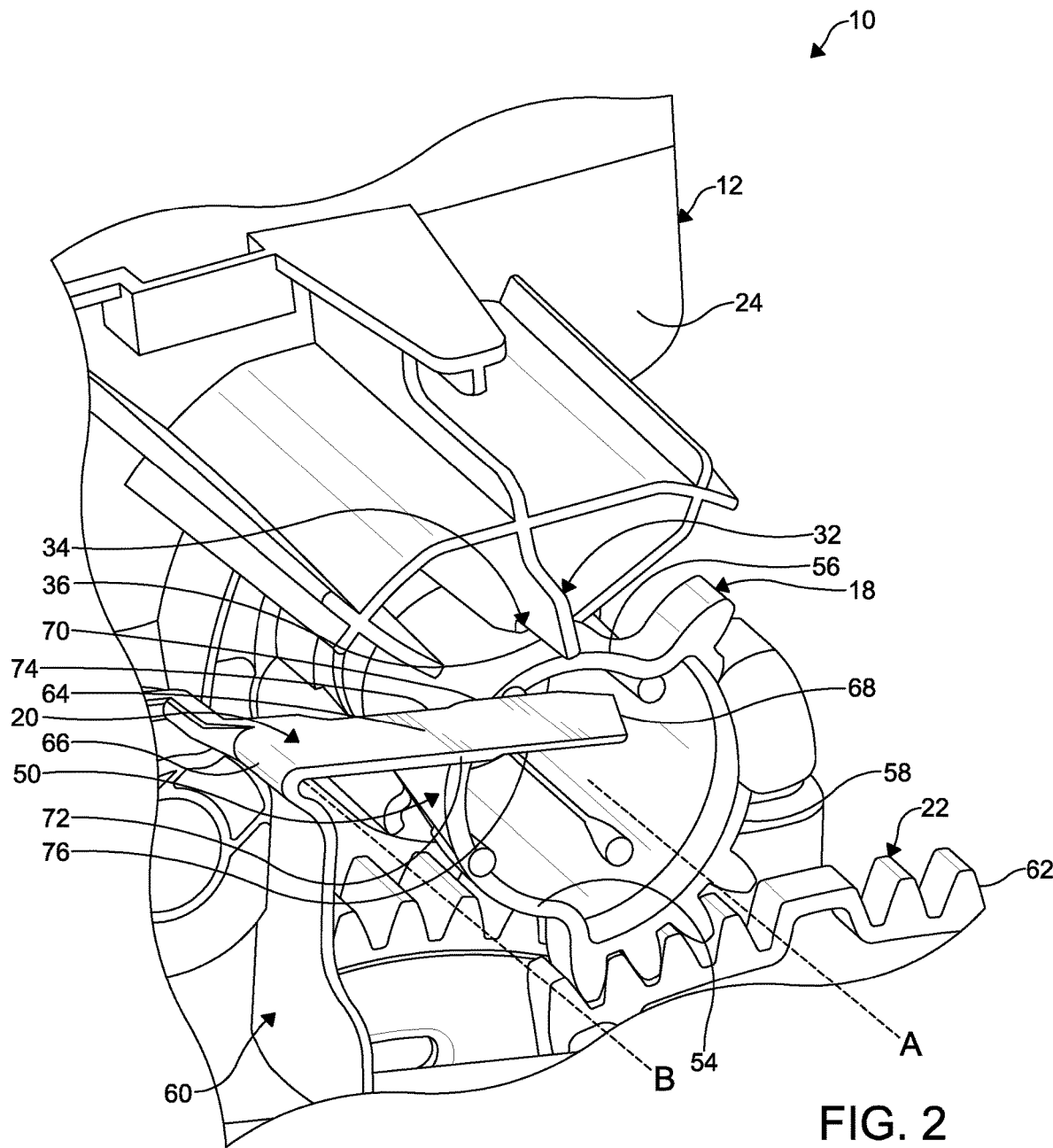
FIG. 2 is an enlarged, fragmentary, top-front perspective view of the air-handling system of FIG. 1, taken at area 2 of FIG. 1.

As shown in in FIG. 2, the tab 20 of the air-handling system 10 extends from the housing 12, and is disposed axially outwardly from the second end 54 of the lever 18 along the first axis A with respect to the outer sidewall 24 of the housing 12, wherein the second end 54 of the lever 18 is disposed axially intermediate the outer sidewall 24 of the housing 12 and the tab 20 when the air-handling system 10 is assembled.

The tab 20 includes an elongate main body 64 having a first end 66 coupled to the housing 12 and a free-floating, distal second end 68. The first end 66 of the tab 20 defines a second axis B of the air-handling system 10. The second axis B of the air-handling system 10 is parallel to and offset from the first axis A of the air-handling system 10, wherein a length of the main body 64 between the first end 66 and the second end 68 extends substantially perpendicular to the first axis A of the air-handling system 10.

Figure 3:
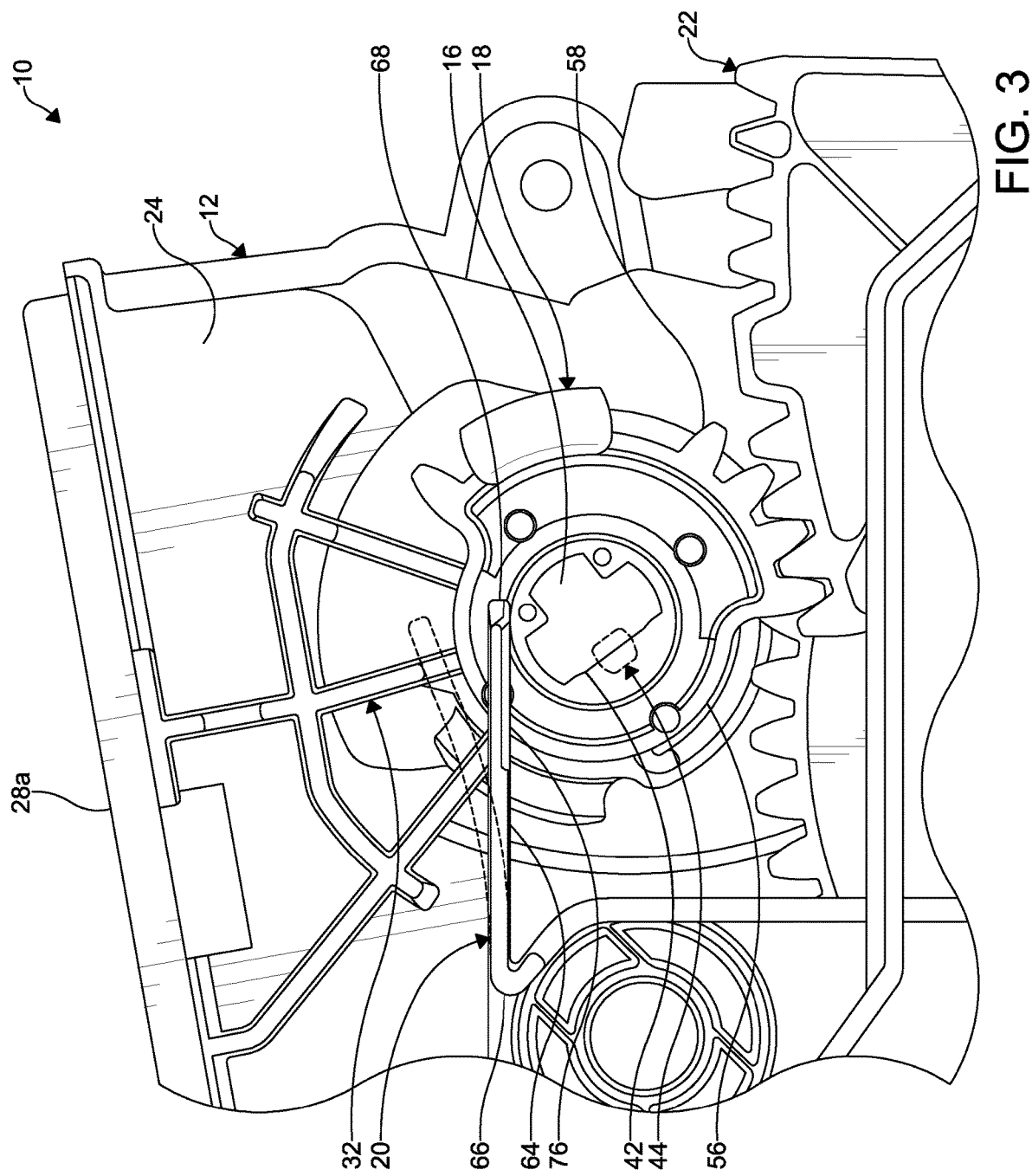
FIG. 3 is an enlarged, fragmentary, side elevational view of the air-handling system of FIG. 1, taken at area 2 of FIG. 1.

The second end 68 of the tab 20 is moveable with respect to the first end 66 of the tab 20. More particularly, the second end 68 of the tab 20 is moveable in an arcuate motion about the second axis B of the air-handling system 10, wherein the second end 68 is positionable in a first position and in a second position, as shown in FIG. 3. In the first position, the second end 68 of the tab 20 is disposed radially inwardly of an outer circumferential surface of the second end 54 of the hub 50 of the lever 18 with respect to the first axis, wherein second end 68 of the tab 20 obstructs the lever 18 in the axial direction. In the second position, the second end 68 of the tab 20 is positioned radially outwardly of the outer circumferential surface of the hub 50 of the lever 18 with respect to the first axis, wherein the lever 18 is unobstructed by the tab 20 along the axial direction.

As shown, the tab 20 is a resilient tab 20, wherein the first end of the tab 20 is fixed and the second end 68 of the tab 20 is movable about the second axis by bending the main body 64 of the tab 20 along the length thereof. More particularly, the illustrated tab 20 is integrally molded as a portion of the mounting bracket 60, wherein the first end 66 of the tab 20 is unitary with the mounting bracket 60. In alternate embodiments, the tab 20 may be coupled directly to the housing 12 or coupled to the housing 12 via a second mounting bracket. The tab 20 may also be rotatably coupled to the air-handling assembly, wherein the first end of the tab 20 is coupled to the housing 12 via a hinge (not shown).

The tab 20 further includes an inner edge 70 facing the outer sidewall 24 of the housing 12, and an outer edge 72 facing away from the outer sidewall 24 of the housing 12. The inner edge 70 of the tab 20 may include a recess 74 formed therein, wherein the recess 74 is configured to receive a portion of the housing 12 therein when the tab 20 is in the second position. In the illustrated embodiment, the recess 74 has a trapezoidal shape, and is formed adjacent the first end 66 of the tab 20.

The outer edge 72 of the tab 20 includes a beveled portion 76 formed adjacent the second end 68 thereof, intermediate the outer edge 72 and a bottom surface of the tab 20. The second end 68 of the tab 20 may also be tapered radially outwardly from the second axis of the air-handling system 10, in a direction towards the housing. The beveled portion 76 and the tapered second end 68 are advantageously configured to minimize the likelihood of the tab 20 obstructing insertion of the lever 18 into the housing 12, wherein the beveled edge of the tab 20 causes the second end 68 of the tab 20 to be biased radially outwardly by the first end 52 of the hub 50 as the lever 18 is assembled to the housing 12.

The use of a moveable tab 20, as discussed above, advantageously provides versatility with respect to assembly of the air-handling system 10, For example, the lever 18 may be assembled to the diverter 14 prior to installation of the drive assembly 22, as shown in FIGS. 5A-5C, or after installation of the drive assembly 22, as shown in FIGS. 6A-6D.

In the method of assembly illustrated in FIGS. 5A-5C, the diverter 14 is first assembled within the housing 12, wherein the drive shaft 16 protrudes from the first opening 30 of the outer sidewall 24. In a next step, shown in FIG. 5B, the lever 18 is assembled to the drive shaft 16, wherein the T-shaped drive shaft 16 is received through the T-shaped aperture 42 of the lever 18, and the first end 52 of the hub 50 is received within the first opening 30 of the outer sidewall 24. As the lever 18 is assembled to the drive shaft 16, the finger 46 of the securing means 44 axially aligns with and engages the detent 48 of the securing means 44 to secure the axial position of the lever 18 on the drive shaft 16. The mounting bracket 60 of the drive assembly 22 is then assembled to the outer sidewall 24 of the housing 12. If the lever 18 is not fully assembled to the drive shaft 16, the inner edge 70 of the tab 20 will contact the second end 54 of the hub 50, thereby preventing the mounting bracket 60 from being assembled to the housing 12, and indicating incomplete assembly of the lever 18 to the drive shaft 16.

Figure 6B:
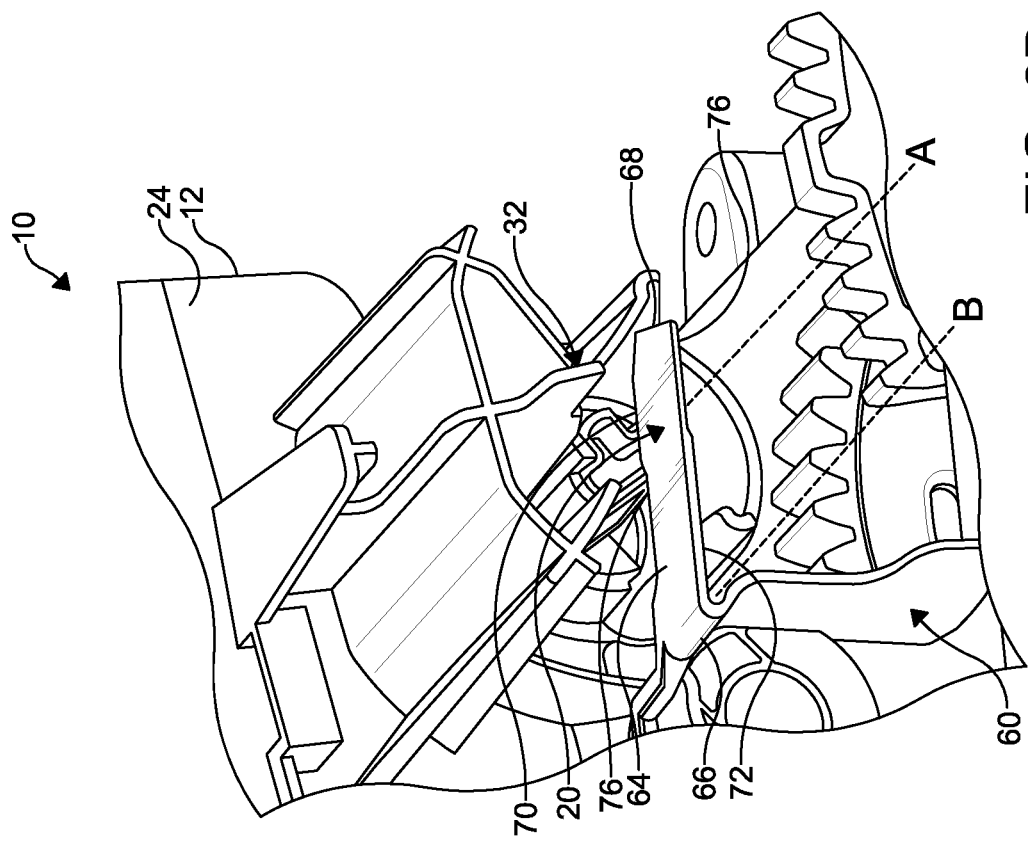
Figure 6A:
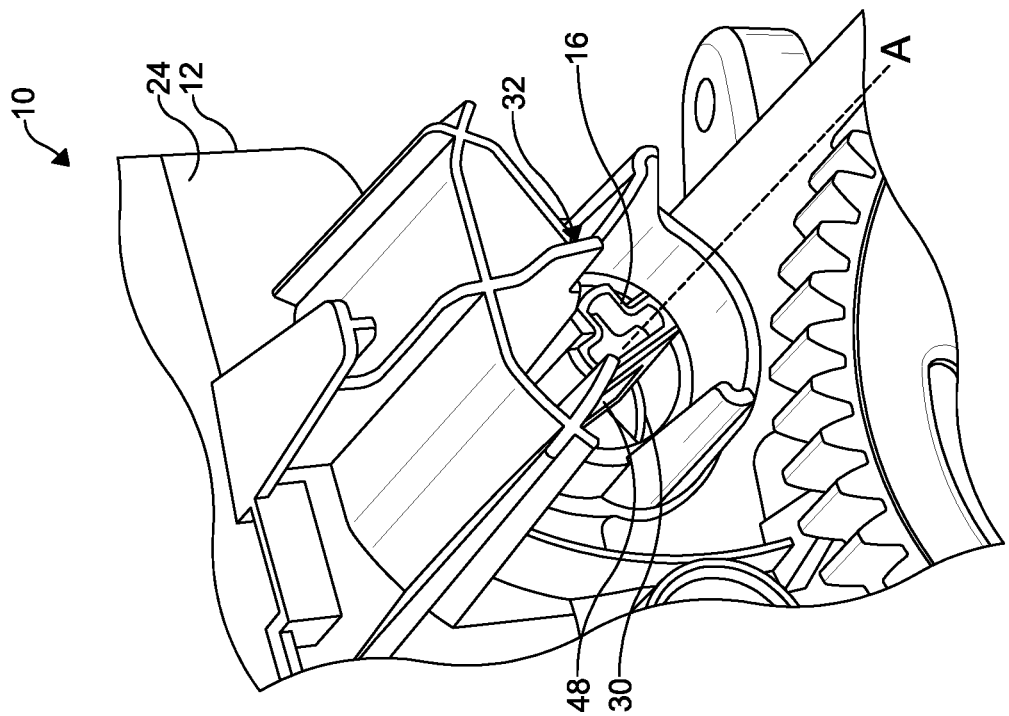

In the alternative method of assembly, shown in FIGS. 6A-6D, the mounting bracket 60 of the drive assembly 22 is assembled to the housing 12 prior to installation of the lever 18, as shown in FIGS. 6A and 6B. To install the lever 18 on the drive shaft 16, the second end 68 of the tab 20 is biased towards the second position. Particularly, the tab 20 may be biased against the hard stop 32, wherein the second end 68 of the tab 20 abuts the contact surface 36 of the notch 34 and is positioned radially outwardly of a projected insertion path of the outer circumferential surface of the hub 50, as shown in FIGS. 6B and 6C. With the tab 20 in the second position, the lever 18 is then axially assembled to the drive shaft 16 until the finger 46 of the securing means 44 engages the detent 48. If the lever 18 is properly assembled, the tab 20 is then returned to the first position, radially inwardly of the outer circumferential surface of the hub 50, as shown in FIG. 5D. However, if the lever 18 is not fully assembled to the drive shaft 16, the second end 68 of the tab 20 will contact the outer circumferential surface of second end 54 the hub 50, preventing movement of the tab 20 to the first position. This interference indicates that the lever 18 is not fully assembled, and corrective measures can be initiated.

From the foregoing description, one ordinarily skilled in the art can easily ascertain the essential characteristics of this invention and, without departing from the spirit and scope thereof, can make various changes and modifications to the invention to adapt it to various usages and conditions.

The invention claimed is:

1. An air-handling system comprising:
a housing defined by an outer sidewall, the outer sidewall having a first opening formed therein, the first opening defining a first axis of the air-handling system;
a shaft rotatably coupled to the housing and extending outwardly from the first opening of the housing;
a lever received on the shaft, wherein an end of the lever extends axially away from the outer sidewall along the first axis; and
a tab disposed axially outwardly from the end of the lever along the first axis with respect to the outer sidewall, wherein the tab includes a first end coupled to the housing and a distal second end, wherein the second end of the tab flexes between a first position to axially obstruct the lever with respect to the first axis and a second position to unobstuct the lever with respect to the first axis, and wherein the second end of the tab in the second position is disposed radially outwardly from an outer circumferential surface of a hub of the lever with respect to the first axis.

2. The air-handling system of claim 1, wherein the first end of the tab defines a second axis parallel to the first axis, and wherein the second end of the tab is moveable in an arcuate motion about the second axis.

3. The air-handling system of claim 1, wherein the second position is radially outwardly from the first position with respect to the first axis.

4. The air-handling system of claim 1, wherein in the first position the second end of the tab is positioned radially inwardly of the outer circumferential surface of the first end of the lever with respect to the first axis.

5. The air-handling system of claim 1, wherein the tab is a resilient tab, and wherein the first end of the tab is fixed and the second end of the tab is moveable by bending the tab along a length thereof.

6. The air-handling system of claim 5, wherein the first end of the tab is fixed to the housing.

7. The air-handling system of claim 5, wherein the first end of the tab is fixed to a mounting bracket coupled to the housing.

8. An air-handling system comprising:
a housing defined by an outer sidewall, the outer sidewall having a shaft extending outwardly therefrom, the shaft defining a first axis; and
a tab extending from the outer sidewall and disposed axially outwardly of the shaft along the first axis, wherein a distal end of the tab flexes in an arcuate motion about a second axis between a first position and a second position, the second axis parallel to the first axis, the second position radially outwardly from the first position with respect to the first axis of the shaft, wherein the tab includes a first end opposite the distal end of the tab and coupled to the housing, wherein the distal end of the tab in the first position axially obstructs the lever with respect to the first axis and in the second position unobstucts the lever with respect to the first axis, and wherein distal end of the tab in the second position is disposed radially outwardly from an outer circumferential surface of a hub of the lever with respect to the first axis.

9. The air-handling system of claim 8, wherein the tab includes an elongate body having a fixed end at the second axis.

10. The air-handling system of claim 9, wherein the tab further includes a beveled portion formed along an outer edge of the tab adjacent the distal end.

11. The air-handling system of claim 10, wherein in the beveled portion a thickness of the tab progressively increases in a direction towards the housing along the first axis.

12. The air-handling system of claim 10, wherein the distal end of the tab is tapered radially outwardly from the second axis in a direction towards the housing along the first axis.

13. The air-handling system of claim 8, wherein an inner edge of the tab includes a recess formed therein, the recess configured to receive a portion of the housing therein when the tab is in the second position.

14. An air-handling system comprising:
a housing defined by an outer sidewall, the outer sidewall having a first opening formed therein, the first opening defining a first axis of the air-handling system;
a shaft rotatably coupled to the housing and extending outwardly from the first opening of the housing;
a protrusion extending outwardly from the outer sidewall of the housing along a direction of the first axis, the protrusion formed radially outwardly of the shaft with respect to the first axis;
a tab flexibly coupled to the housing, wherein a distal end of the tab is flexibly moveable in an arcuate motion about a second axis of the air-handling system defined by a first end of the tab, the second axis parallel to the first axis; and
a lever axially and slidingly received on the shaft, a portion of the lever disposed intermediate the outer sidewall and the tab, the distal end of the tab flexes between a first position and a second position, wherein the distal end of the tab in the first position axially obstructs the lever with respect to the first axis and in the second position unobsructs the lever with respect to the first axis.

15. The air-handling system of claim 14, wherein in the second position the tab abuts the protrusion.

16. The air-handling system of claim 14, wherein in the first position, the tab is spaced apart from the protrusion.

17. The air-handling system of claim 14, further comprising a mounting bracket removably coupled to the housing, wherein the tab is unitarily formed with the mounting bracket.

18. The air-handling system of claim 1, wherein the hub has a first end coupled to the shaft and an opposing second end, the second end extending axially away from the housing along the first axis, the second end of the hub including a cylindrical portion defined by the hub and a geared portion having a plurality of teeth projecting radially outwardly therefrom.

19. The air-handling system of claim 18, wherein the tab includes an inner edge facing the outer sidewall of the housing and an outer edge facing away from the outer sidewall of the housing, and wherein the inner edge of the tab includes a recess formed therein to receive a portion of the housing when the distal end of the tab is in the second position.

20. The air-handling system of claim 19, wherein the tab includes a beveled portion formed adjacent the second end thereof, intermediate the outer edge and a bottom surface of the tab.

* * * * *